United States Patent
Shin

[11] Patent Number: 5,833,125
[45] Date of Patent: Nov. 10, 1998

[54] PINCH ROLLER ASSEMBLY FOR USE IN A VIDEO CASSETTE RECORDER

[75] Inventor: Ki-Hoon Shin, Seoul, Rep. of Korea

[73] Assignee: Daewoo Electronics Co., Ltd., Seoul, Rep. of Korea

[21] Appl. No.: 570,882

[22] Filed: Dec. 12, 1995

[30] Foreign Application Priority Data

Mar. 29, 1995 [KR] Rep. of Korea ............... 1995 5847

[51] Int. Cl.⁶ ............... B65H 20/02; B65H 20/36
[52] U.S. Cl. ............................... 226/194; 226/190
[58] Field of Search ............... 226/190, 194; 384/209

[56] References Cited

U.S. PATENT DOCUMENTS

| | | | |
|---|---|---|---|
| 382,893 | 5/1888 | Miller | 384/209 |
| 1,288,707 | 12/1918 | Sharp | 384/209 |
| 4,910,424 | 3/1990 | Borcherding | 384/209 |
| 5,033,872 | 7/1991 | Ueno et al. | 384/209 |
| 5,373,982 | 12/1994 | Takahashi | 226/194 |
| 5,435,652 | 7/1995 | Howard | 384/209 |

*Primary Examiner*—Daniel P. Stodola
*Assistant Examiner*—Matthew A. Kaness
*Attorney, Agent, or Firm*—Pennie & Edmonds LLP

[57] ABSTRACT

A pinch roller assembly for use in a video cassette recorder, which comprises: a pinch roller, a supporting shaft provided with a cylindrical section and a spherical portion protruding therefrom, a sleeve having an upper section, a lower section and a contact section joining them together, and a bush provided with a tapered surface. The spherical portion of the supporting shaft comes into a loose contact with the contact section of the sleeve and the tapered surface of the bush, and there exist gaps between the cylindrical section of the supporting shaft and the upper section of the sleeve and between the cylindrical section of the supporting shaft and the inner surface of the bush, respectively, to thereby allow the pinch roller to pivot about the spherical portion of the supporting shaft and to realign itself to be parallel with respect to a capstan shaft while it presses against a capstan shaft.

6 Claims, 2 Drawing Sheets

PINCH ROLLER ASSEMBLY FOR USE IN A VIDEO CASSETTE RECORDER

FIELD OF THE INVENTION

The present invention relates to a pinch roller assembly for use in a video cassette recorder; and, more particularly, to an improved pinch roller assembly, with a simpler structure and a decreased production cost, capable of ensuring a stable running of a magnetic tape loaded in the recorder.

DESCRIPTION OF THE PRIOR ART

A video cassette recorder ("VCR") has a pinch roller assembly on a deck thereof for providing stability to magnetic tape running so as to facilitate the reading/writing action of a video head off/on the running magnetic tape. In order to let the magnetic tape run with a constant speed and under a proper tension, the pinch roller assembly pivotably mounted on the deck serves to press the running magnetic tape against a capstan shaft adjacent to the pinch roller assembly.

In FIG. 1, there is shown a schematic top view of a deck 10 of a conventional VCR having a pinch roller assembly 6. As shown, a magnetic tape T runs between a supply reel 1 and a take-up reel 2 passing through a full erasing head 3, a rotating head drum 4 and a capstan shaft 5.

The pinch roller assembly 6 is typically designed to move toward and away from the capstan shaft 5 on the deck 10, in the direction as indicated with an arrow. During a fast forward or rewind operation of the VCR, the pinch roller assembly 6 is kept detached from the capstan shaft 5. However, during a recording or reproducing mode of the VCR, the pinch roller assembly 6 moves close to the capstan shaft 5 and presses the running magnetic tape T against the capstan shaft 5.

In the pressing-position of the pinch roller assembly 6, the capstan shaft 5 driven by a capstan motor (not shown) along with the pinch roller assembly 6 exerts a steady rotational friction force on the tape T interposed therebetween. Thus, the tape T runs in a stable manner without incurring any unwanted increase or decrease in the running speed or a severe fluctuating movement.

Further, the rotational friction force of the capstan shaft 5 applies a slight tension to the tape T wrapping around the head drum 4 so that video heads (not shown) on the head drum 4 can read/write a signal off/on the tape T with accuracy.

In order to maintain a high level of reading/writing capability mentioned above, it is preferred that, when the pinch roller assembly 6 presses the capstan shaft 5, a uniform force be applied along the capstan shaft 5 by the lateral surface of the pinch roller assembly 6.

It is, however, practically difficult to hold a supporting shaft of the pinch roller assembly 6 and the capstan shaft 5 in a perfect parallel relationship with each other during all the while they are operating. Even if the supporting shaft is installed on the deck 10 in a complete parallel relationship with the capstan shaft 5 initially, the pinch roller supporting shaft may be slanted later due to a its own deformation or a twist of a pivot arm supporting the supporting shaft.

When the two shafts are not in a parallel relationship with each other, the tape T is pressed partially by a limited portion, for example, an upper or a lower portion of the lateral surface of the pinch roller, rather than by its entire vertical range. This may cause the magnetic tape T to run upwardly or downwardly, deviating from its normal running path, or the surface of the tape T to be damaged by a nonuniform pressing force of the pinch roller assembly.

In order to overcome the above-mentioned problems, a conventional pinch roller assembly is normally provided with a ball bearing between a supporting shaft and a sleeve.

FIG. 2 shows a capstan shaft 5 and a conventional pinch roller assembly 20 having a pinch roller 13, a sleeve 13a, a supporting shaft 12 and a ball bearing 11. Since the ball bearing 11 is normally designed to have a room to adjust, i.e., a clearance between an inner ring 11a, balls 11b and an outer ring 11c, it is possible for the pinch roller 13 to adjust itself up to a certain extent of an angular misalignment, as indicated with an angle $\alpha°$, with respect to the supporting shaft 12. The size of the angle $\alpha°$ is determined by the structure of the pinch roller assembly 20, mainly by the size of the clearance mentioned above. This type of pinch roller assembly 20 can perform properly even when the capstan shaft 5 and the supporting shaft 12 are not perfectly parallel. However, the use of the ball bearing 11, being a relatively expensive machine element, results in an increase in the production cost of the pinch roller assembly 20.

As another method to overcome the above-mentioned problems associated with the pinch roller assembly, Japanese Utility Model Laid-Open Publication No. 89-177,436 reveals a pinch roller assembly which comprises a supporting shaft having an annular groove with a semi-circled cross section on its external surface and a cylindrical rotating body having a corresponding annular protuberance on the inner surface thereof.

Further, Japanese Utility Laid-Open Publication Nos. 89-177,437 and 89-174,731 disclose pinch roller assemblies, having a ball-shaped magnetic structure and a ring-shaped bearing between a supporting shaft and a rotating body.

However, the prior art pinch roller assemblies discussed above also have other disadvantages in that the semi-circled cross sectional groove and the protuberance, the ball-shaped magnetic structure and the ring-shaped bearing may still make the manufacturing process of the pinch roller assembly complicate and difficult.

SUMMARY OF THE INVENTION

It is, therefore, a primary object of the invention to provide a pinch roller assembly, with a simpler structure and a decreased production cost, capable of ensuring a stable running of a magnetic tape loaded in the recorder.

In accordance with one aspect of the present invention, there is provided a pinch roller assembly for use in a video cassette recorder, which comprises: a pinch roller; a supporting shaft provided with a cylindrical section and a spherical portion protruding therefrom, wherein an outer diameter of the cylindrical section is smaller than that of the spherical portion; a sleeve provided with an upper section, a lower section and a contact section joining them together and tightly fitted into the pinch roller, wherein an inner diameter of the upper section is larger than the outer diameter of the cylindrical section of the supporting shaft, resulting in a desired gap therebetween, but smaller than the outer diameter of the spherical portion of the supporting shaft, while an inner diameter of the lower section is larger than the outer diameter of the spherical portion of the supporting shaft, and the supporting shaft is inserted into the sleeve from below; a bush provided with a tapered surface and an inner surface having a diameter larger than the outer diameter of the cylindrical section of the supporting shaft, the bush tightly fitted into the lower section of the sleeve, thereby resulting in a desired gap between the inner surface thereof and the cylindrical section of the supporting shaft.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENT

Figure 1:
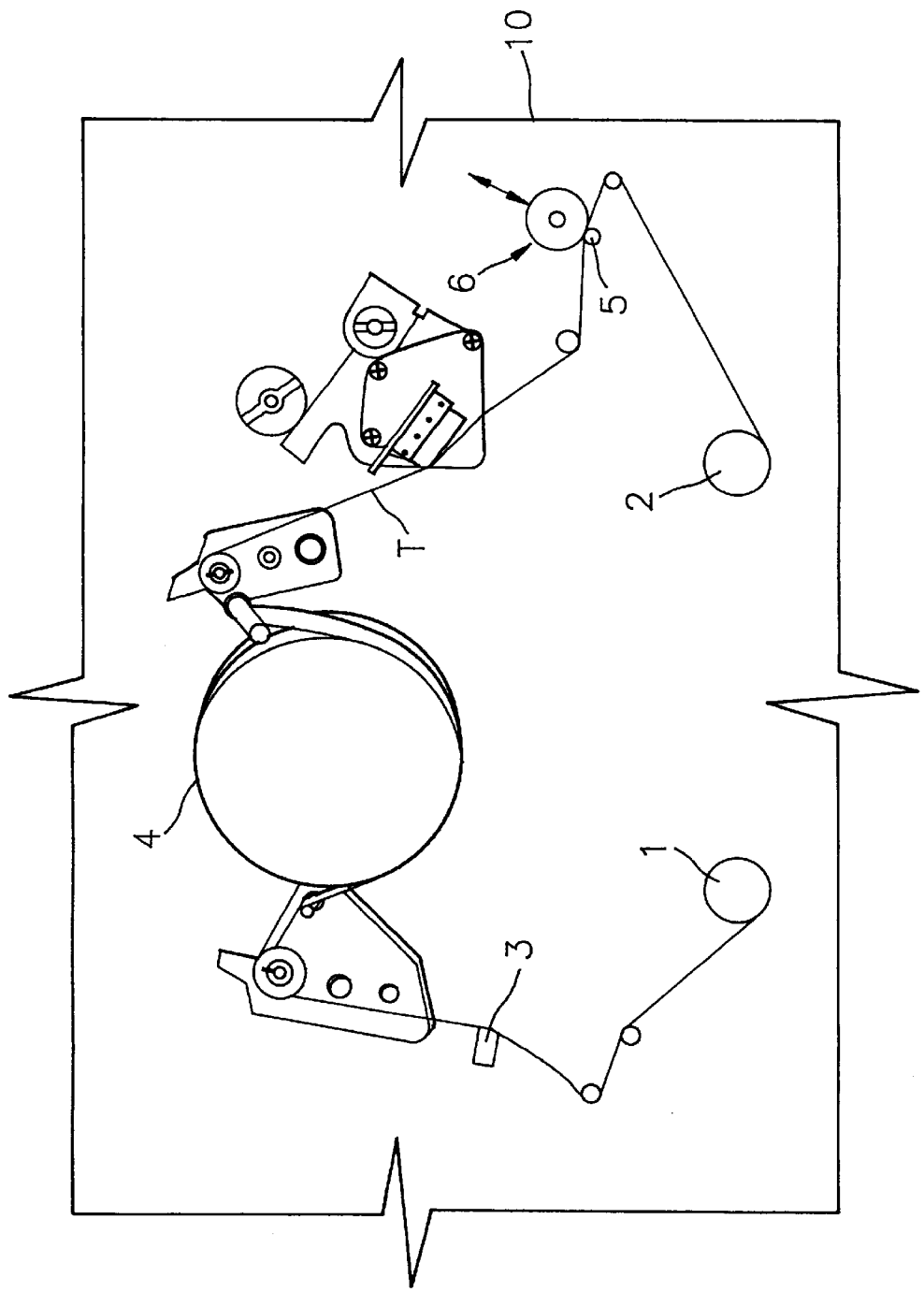
FIG. 1 shows a schematic top view of a deck of a conventional video cassette recorder.
Figure 2:
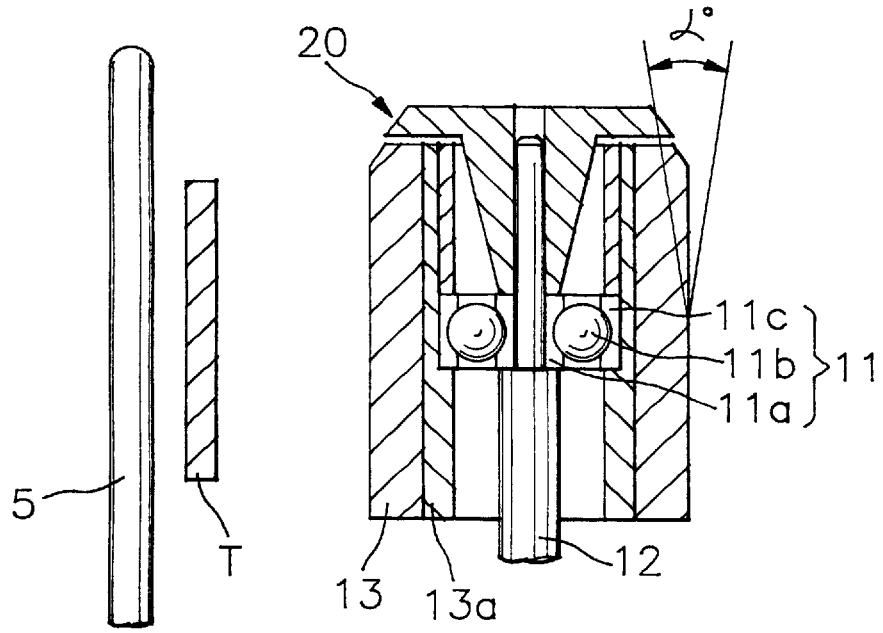
FIG. 2 represents a longitudinal sectional view of a prior art pinch roller assembly, spaced apart from a capstan shaft.
Figure 3:
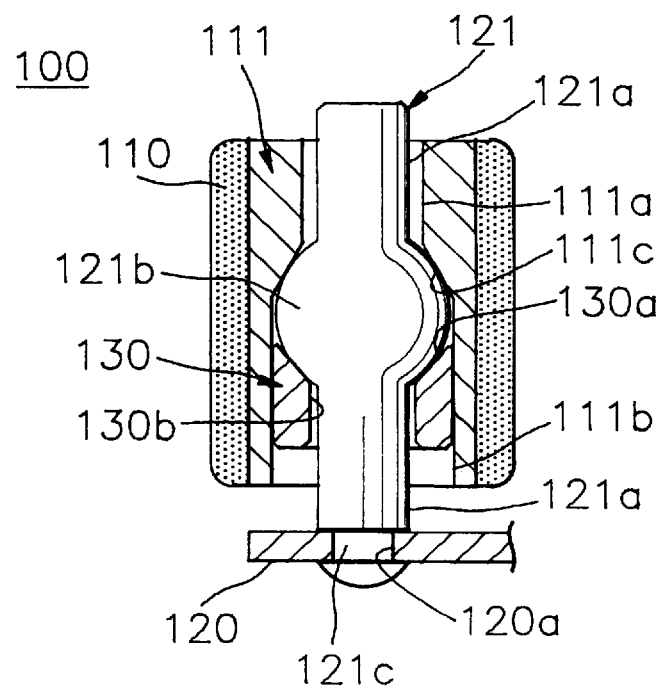
FIG. 3 illustrates a longitudinal sectional view of a preferred embodiment of a pinch roller assembly in accordance with the present invention.

There is shown in FIG. 3 a longitudinal sectional view of a preferred embodiment of the inventive pinch roller assembly 100. The inventive pinch roller assembly 100 is described using FIGS. 1 and 3.

The pinch roller assembly 100 of the present invention comprises a pinch roller 110, a sleeve 111, a supporting shaft 121 and a bush 130.

The pinch roller 110 is adapted to press the magnetic tape T against the capstan shaft 5 face-to face, and is made of a resilient material such as rubber.

The supporting shaft 121 is provided with a cylindrical section 121a, a spherical portion 121b protruding therefrom and formed at or near the center thereof, and a lower end portion 121c, wherein an outer diameter of the cylindrical section 121a is smaller than that of the spherical portion 121b. It is preferable that the supporting shaft 121 be made of a metal and the cylindrical section 121a and the spherical portion 121b be integrally formed by, e.g., forging.

The sleeve 111 is provided with an upper section 111a, a lower section 111b and a contact section 111c. An inner diameter of the upper section 111a is larger than the outer diameter of the cylindrical section 121a of the supporting shaft 121, resulting in a desired gap therebetween, but is smaller than the outer diameter of the spherical section 121b, while an inner diameter of the lower section 111b is larger than the outer diameter of the spherical section 121b. The contact section 111c joins the upper and the lower sections 111a, 111b together.

The bush 130 is provided with a tapered surface 130a and an inner surface 130b with a diameter larger than the outer diameter of the cylindrical section 121a, resulting in a desired gap therebetween.

A process of assembling the pinch roller assembly 100 of the present invention will now be described.

The sleeve 111 is tightly fitted into the pinch roller 110 to thereby allow the pinch roller 110 to exert a sufficient pressing force against the capstan shaft 5.

The supporting shaft 121 is inserted into the sleeve 111 from below until the upper surface of the spherical portion 121b comes in a loose contact with the contact section 111c, thereby preventing the pinch roller 110 from moving further downward, but allowing its pivotal motion.

The bush 130 is, then, tightly fitted into the lower section 111b of the sleeve 111 until the tapered surface 130a comes in a loose contact with the lower surface of the spherical portion 121b, preventing the pinch roller 110 from moving further upward, but allowing its pivotal motion.

Since these loose contacts mentioned above allow the pivotal motion of the pinch roller 110, the pinch roller 110 can move pivotally to a certain extent, mainly determined by the size of the gaps between the cylindrical section 121a of the supporting shaft 121 and the upper section 111a of the sleeve 111 and between the cylindrical section 121a of the supporting shaft 121 and the inner surface 130b of the bush 130, respectively.

The pinch roller assembly 100 is secured to a pivot arm 120 by fixing the lower end portion 121c of the supporting shaft 121 in a throughhole 120a of the pivot arm 120 using appropriate fastening means, e.g., riveting. It is preferable that the lower end portion 121c have an outer diameter smaller than that of the cylindrical section 121a.

In such a pinch roller assembly 100 in accordance with the present invention, even if the supporting shaft 121 is not installed perfectly parallel with respect to the capstan shaft 5, the pinch roller 110 can realign itself to be parallel with respect to the capstan shaft 5 up to a certain extent as mentioned above while it presses against the capstan shaft 5.

Therefore, the pinch roller assembly 100 of the present invention can achieve the same functions as, and yet with a simpler structure and a lower production cost than the prior art devices.

Although the invention has been shown and described with respect to the preferred embodiments, it will be understood by those skilled in the art that various changes and modifications may be made without departing from the spirit and scope of the invention as defined in the following claims.

What is claimed is:

1. A pinch roller assembly for use in a video cassette recorder, which comprises:

a pinch roller;

a supporting shaft provided with a cylindrical section and a spherical portion protruding therefrom, wherein an outer diameter of the cylindrical section is smaller than that of the spherical portion;

a sleeve provided with an upper section, a lower section and a contact section joining the upper and the lower sections together, the sleeve being tightly fitted into the pinch roller, wherein an inner diameter of the upper section is larger than the outer diameter of the cylindrical section of the supporting shaft, resulting in a desired gap therebetween, but smaller than the outer diameter of the spherical portion of the supporting shaft, while a diameter of the lower section is larger than the outer diameter of the spherical portion of the supporting shaft, and the supporting shaft is inserted into the sleeve from below in such a way that the spherical portion thereof comes in a loose contact with the contact section of the sleeve; and a bush provided with a tapered surface and an inner surface having a diameter larger than the outer diameter of the cylindrical section of the supporting shaft, the bush being tightly fitted into the lower section of the sleeve in such a way that the tapered surface thereof comes in a loose contact with the spherical portion of the supporting shaft, thereby resulting in a desired gap between the inner surface thereof and the cylindrical section of the supporting shaft.

2. The pinch roller assembly of claim 1, wherein the supporting shaft is made of a metal.

3. The pinch roller assembly of claim 1, wherein the cylindrical section and the spherical portion of the supporting shaft are integrally formed.

4. The pinch roller assembly of claim 3, wherein the spherical portion is located at or near the center of the cylindrical section.

5. The pinch roller assembly according to any one of claims 1 to 4, wherein the supporting shaft is further provided with a lower end portion which has an outer diameter smaller than that of the cylindrical portion.

6. A video cassette recorder incorporating therein a pinch roller assembly, wherein the pinch roller assembly comprises:

a pinch roller;

a supporting shaft provided with a cylindrical section and a spherical portion protruding therefrom, wherein an outer diameter of the cylindrical section is smaller than that of the spherical portion;

a sleeve provided with an upper section, a lower section and a contact section joining the upper and the lower sections together, the sleeve being tightly fitted into the pinch roller, wherein an inner diameter of the upper section is larger than the outer diameter of the cylindrical section of the supporting shaft, resulting in a desired gap therebetween, but smaller than the outer diameter of the spherical portion of the supporting shaft, while a diameter of the lower section is larger than the outer diameter of the spherical portion of the supporting shaft, and the supporting shaft is inserted into the sleeve from below in such a way that the spherical portion thereof comes in a loose contact with the contact section of the sleeve; and a bush provided with a tapered surface and an inner surface having a diameter larger than the outer diameter of the cylindrical section of the supporting shaft, the bush being tightly fitted into the lower section of the sleeve in such a way that the tapered surface thereof comes in a loose contact with the spherical portion of the supporting shaft, thereby resulting in a desired gap between the inner surface thereof and the cylindrical section of the supporting shaft.

\* \* \* \* \*